Patented May 30, 1950

2,509,309

UNITED STATES PATENT OFFICE 2,509,309

PREPARATION OF EPHEDRINE AND SALTS THEREOF

Igor Scriabine, Lyon, France, assignor to Societe des Usines Chimiques Rhone-Poulenc, Paris, France, a corporation of France No Drawing. Application May 14, 1948, Serial No. 27,149. In France May 23, 1947

6 Claims. (Cl. 260—570.6)

This invention relates to the production of ephedrine and salts thereof.

It is known to prepare ephedrine by reducing phenylacetylcarbinol in the presence of methylamine or salts thereof. The processes hitherto described give either the racemic mixture or the laevo-rotatory form of the compound.

It has been proposed to produce the laevo-rotatory form, which is the more active therapeutically, by means of chemical reduction by activated aluminium in a basic medium in the presence of methylamine, or by means of catalytic reduction in a basic medium in the presence of catalysts based on precious metals, such as colloidal platinum or palladium and in the presence of methylamine, or by means of catalytic reduction in a neutral medium by catalysts of the nickel group, in the presence of salts of methylamine.

On the other hand, it is stated in German patent specification No. 588,880 that catalytic hydrogenation of laevo-rotatory keto-alcohols with metals of the nickel group, in the presence of ammonia or of primary amines, gives racemic compounds.

It has now been found, however, that the rule stated in the said German patent specification is not so general as is claimed and that the nature of the final product depends upon the operating conditions. Thus the production of racemic ephedrine by hydrogenation of laevo-rotatory phenyl-acetylcarbinol, with catalysts of the nickel group in the presence of methylamine, is due to racemisation of the starting substance. This racemisation is greater in proportion as the temperature is higher and the duration of reaction more prolonged. It has now been found that a process of rapid hydrogenation at low temperature leads to the production of laevo-rotatory ephedrine with excellent yields.

According to the present invention, therefore, a process for the production of laevo-rotatory ephedrine and salts thereof comprises rapidly hydrogenating laevo-rotatory phenylacetylcarbinol at low temperature in the presence of methylamine and a nickel-containing catalyst.

Laevo-rotatory phenylacetylcarbinol can be prepared, for example, by the process described by C. Neuberg and J. Hirsch in Bioch. Z, 115, 282 (1921).

The catalysts employed preferably consist predominantly of nickel. It is possible, for example, to employ catalysts consisting of finely divided nickel which are obtained by dissolving in alkali the aluminium constituent of a nickel-aluminium alloy. It is also possible to start with nickel-aluminium alloys containing small quantities of other alloyed metals, such as chromium, molybdenum, cobalt, platinum and the like.

It is preferable to work under pressure in order to accelerate the reaction. A pressure of between 20 and 30 kg. per sq. cm. generally gives a suitable speed of hydrogenation, while a higher pressure substantially improves the yield.

The reaction temperature must be chosen sufficiently low to prevent as far as possible racemisation of the phenylacetylcarbinol. This racemisation is substantial even at 10° C., and it is therefore important to work at a temperature which is not too far in excess of this limit, and preferably at one which is lower, but it is desirable to cool to a temperature substantially below 0° C.

An advantage of the process according to the invention is that it gives high yields such as could previously only be obtained in the presence of catalyst consisting of precious metals. The nickel catalysts employed in the present process are easily obtained on an industrial scale.

The following examples, in which the parts are by weight, are given by way of illustration and are not intended to limit the invention.

Example I 530 parts of a solution of 1-phenylacetylcarbinol in di-n-butyl ether, of which the phenylacetylcarbinol content (determined by titration with hydroxylamine hydrochloride and calculating all the carbonyl compounds present as phenylacetylcarbinol) is 13.2%, that is, 70 parts of phenylacetylcarbinol, were hydrogenated in the presence of 256 parts of ethyl alcohol (95° G. L.), 229 parts of a 17.5% solution of methylamine in ethyl alcohol and 100 parts of Raney nickel, under a pressure of 30 kg. per sq. cm. at 0° C. The hydrogenation lasted 5½ hours. The product was filtered, the alcohol was distilled off and the residue was diluted with benzene and extracted with dilute hydrochloric acid. 54.2 parts of crude ephedrine hydrochloride were obtained, from which 40.4 parts of pure 1-ephedrine hydrochloride (42.5% of the theoretical yield) were recovered after purification by known means.

Example II 35 parts of a solution of crude active phenylacetylcarbinol in di-n-butyl-ether, containing 10 parts of phenylacetylcarbinol, were hydrogenated in the presence of 4.4 parts of methylamine (employed in 24.45% alcoholic solution), 36 parts of methanol and 15 parts of platinised Raney nickel (containing 1% platinum), under a pressure of 30 kg. per sq. cm. and at a temperature between 0° C. and 5° C. Duration of the hydrogenation was 2 hours and 25 minutes. After treatment as described in Example I, 9.35 parts of crude 1-ephedrine hydrochloride were obtained, from which 6.3 parts of pure 1-ephedrine hydrochloride were recovered, representing a yield 47% of that theoretically possible.

*Example III*

244 parts of crude active phenylacetylcarbinol (obtained by fermentation and containing 100 g. of phenylacetylcarbinol as shown by titration with hydroxylamine hydrochloride), 41.5 parts of methylamine in solution in 560 parts of alcohol and 50 parts of chromium-activated nickel, prepared by the alkaline treatment of an alloy of aluminium with 46% of nickel and 2.2% of chromium, were hydrogenated at 0° C. under a pressure of 25–30 kg. per sq. cm. in 7 hours. By treatment of the product of the reaction as hereinbefore described, and recrystallisation, 66.7 parts of pure 1-ephedrine hydrochloride were recovered. Melting point 216° C., $[\alpha]_D^{25} = -33.8°$, yield 50.4% of that theoretically possible.

In addition, 17.4 parts of a mixture of the hydrochlorides of dl-ephedrine and of 1-ephedrine, and 15.65 parts of 1-pseudo-ephedrine hydrochloride were recovered.

I claim:

1. A process for the production of laevo-rotatory ephedrine and salts thereof which comprises hydrogenating laevo-rotatory phenylacetyl carbinol at superatmospheric pressure and at a temperature below 10° C., in the presence of methylamine and a predominantly nickel-containing catalyst.

2. A process for the production of laevo-rotatory ephedrine and salts thereof which comprises hydrogenating laevo-rotatory phenylacetyl carbinol at superatmospheric pressure and at a temperature between 0° C. and 10° C., in the presence of methylamine and a nickel-containing catalyst.

3. A process for the production of laevo-rotatory ephedrine and salts thereof which comprises hydrogenating laevo-rotatory phenylacetyl carbinol at superatmospheric pressure and at a temperature below 10° C., in the presence of methylamine and a catalyst consisting essentially of finely divided nickel and containing at most only minor proportions of other catalytic metals.

4. A process for the production of laevo-rotatory ephedrine and salts thereof which comprises hydrogenating laevo-rotatory phenylacetyl carbinol at a pressure between 20 and 30 kg. per sq. cm. and at a temperature below 10° C. in the presence of methylamine and a predominantly nickel-containing catalyst.

5. A process for the production of laevo-rotatory ephedrine and salts thereof which comprises rapidly hydrogenating laevo-rotatory phenylacetyl carbinol at superatmospheric pressure and at a temperature below 10° C., in the presence of methylamine and a catalyst consisting essentially of finely divided nickel and containing at most only minor proportions of other catalytic metals.

6. A process for the production of laevo-rotatory ephedrine and salts thereof which comprises rapidly hydrogenating laevo-rotatory phenylacetyl carbinol at a pressure between 20 and 30 kg. per sq. cm. and at a temperature between 0° C. and 10° C., in the presence of methylamine and a catalyst consisting essentially of finely divided nickel and containing at most only minor proportions of other catalytic metals.

IGOR SCRIABINE.

REFERENCES CITED

The following references are of record in the file of this patent:

UNITED STATES PATENTS

| Number | Name | Date |
|---|---|---|
| 1,951,302 | Bockmuhl et al. | Mar. 13, 1934 |
| 1,956,950 | Hildebrandt et al. | May 1, 1934 |

FOREIGN PATENTS

| Number | Country | Date |
|---|---|---|
| 360,334 | Great Britain | Nov. 5, 1931 |
| 365,535 | Great Britain | Jan. 15, 1932 |
| 365,540 | Great Britain | Jan. 18, 1932 |